United States Patent [19]
Norrby

[11] Patent Number: 6,081,975
[45] Date of Patent: Jul. 4, 2000

[54] HOOK FOR WEBBING

[76] Inventor: Henry Norrby, Öjevägen 69, Järvsö S-820 40, Sweden

[21] Appl. No.: 09/242,170
[22] PCT Filed: Mar. 16, 1998
[86] PCT No.: PCT/SE98/00471
   § 371 Date: Feb. 10, 1999
   § 102(e) Date: Feb. 10, 1999
[87] PCT Pub. No.: WO98/41770
   PCT Pub. Date: Sep. 24, 1998

[30] Foreign Application Priority Data

Mar. 17, 1997 [SE] Sweden ................................. 9700955

[51] Int. Cl.⁷ ............................. F16L 45/00; A44B 11/00
[52] U.S. Cl. ........................... 24/369; 294/82.2; 24/265 H
[58] Field of Search .................... 24/369, 265 H, 24/598.4, 598.5, 600.9, 598.7, 265 AL; 294/82.2, 82.19

[56] References Cited

U.S. PATENT DOCUMENTS

| | | | |
|---|---|---|---|
| 411,857 | 10/1889 | De Long | 24/369 X |
| 1,300,078 | 4/1919 | Widstand | 24/600.9 |
| 1,466,615 | 8/1923 | Falstrault | 24/600.9 |
| 1,499,932 | 7/1924 | Jacobson | 24/600.9 |
| 1,740,847 | 12/1929 | Wehringer | 24/598.7 |
| 2,856,663 | 10/1958 | Elsner | 24/265 H |
| 3,046,630 | 7/1962 | Morrissey | 24/600.9 |
| 5,832,572 | 11/1998 | Norrby | 24/600.9 |

FOREIGN PATENT DOCUMENTS

| | | |
|---|---|---|
| 2441084 | 6/1980 | France . |
| 504735 | 4/1997 | Sweden . |

*Primary Examiner*—James R. Brittain
*Assistant Examiner*—Robert J. Sandy
*Attorney, Agent, or Firm*—Young & Thompson

[57] ABSTRACT

A hook for webbing comprises a metal rod bent in a single piece having an upper cross piece (1) intended for receiving a webbing, said cross piece transforming into two legs (2, 2') which converge from opposite ends thereof so as to form a loop part together with the cross piece, at least one of the legs transforming into a curved portion (4, 4') forming a lower hook part (5). The curved rod portion (4, 4') of the hook part (5) has a height which is larger than the width thereof in a cross-section in the area of the bottom of the hook part and thus a moment of inertia which is larger than the moment of inertia of a conventional round rod. In addition, the cross piece (1) has a cross-section-wise larger height than width and is, with the geometrical normal or major axis thereof, obliquely inclined in relation to the legs, more precisely into a plane of forces extending towards the hook part (5).

8 Claims, 2 Drawing Sheets

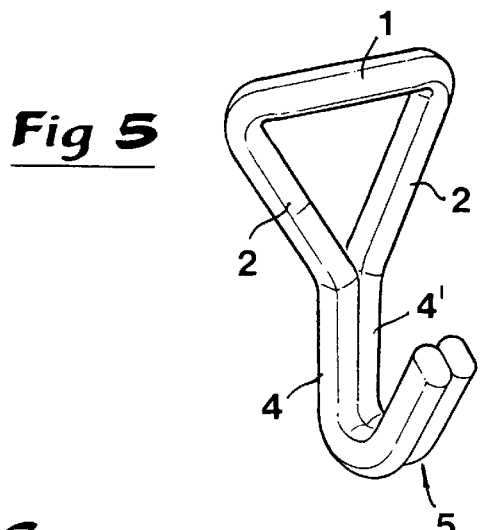
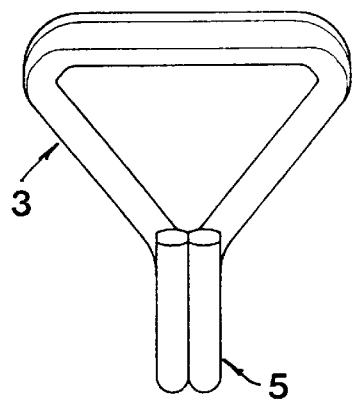
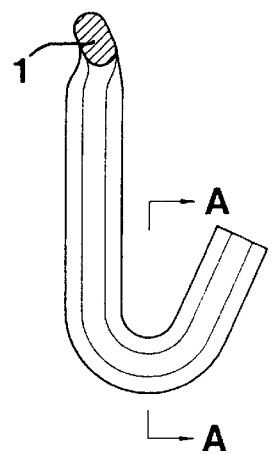
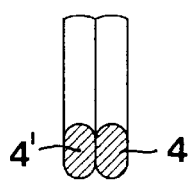
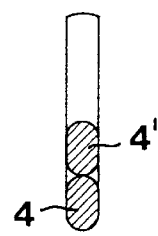

HOOK FOR WEBBING

FIELD OF THE INVENTION

This invention relates to a hook for webbing comprising a metal rod bent in a single piece having an upper cross piece intended for receiving a webbing, said cross piece transforming into two legs which converge from opposite ends thereof, so as to form a loop part together with the cross piece and at least one of which transforms into a curved portion for forming a lower hook part. In practice, such hooks are made with two approximately equally long curved rod portions, which together form a lower hook part.

PRIOR ART

Hooks of the above-mentioned kind constitute a mass-produced article which is used in combination with different kinds of webbing, for instance ties and straps (see e.g. SE 9602524-2), more precisely with the purpose of enabling fastening of the webbing in holders, e.g. rings, hooks or the like, on trail cars, platform bodies, etc. Out of competition, it has always been an ambition to manufacture these hooks at a cost being as low as possible. An important factor for keeping the manufacturing cost down as much as possible is that the hook is made in one single piece of a rod blank, more precisely by bending the blank in a machine and then harden it (in some embodiments it also occurs that two curved portions of the proper hook part are welded together by spot welding). Previously known hooks for webbing made of one single rod piece has usually been designed with two identical, although mirror-inverted side halves, more precisely of a genuine round rod, i.e. a rod having circular cross-sectional shape along the entire length thereof, the two curved rod portions forming the hook part being put side by side next to each other. Crucial for the dimensioning of each individual standard type of hook is primarily the flexural rigidity of the hook part. Namely, if the two curved rod portions which together form said hook part would be under-dimensioned relative to a predetermined loading capacity (=rated load), there is a risk that the hook part is straightened when the webbing together with the hook are loaded maximally. Another important factor for the dimensioning is constituted by the flexural rigidity of the cross piece connected to the webbing. If said cross piece becomes too weak relative to the length thereof it may sag at maximum load and thereby deform the hook in its entirety. Previous attempts made in order to reduce the manufacturing cost for such hooks for webbing have generally been focused on reducing the rod diameter to an absolute minimum value considering current security regulations as well as maximising the inherent structural strength of the material by suitable choices of material and refining the hardening and finishing methods. However, these attempts have not in practice led to any radical cost reductions.

OBJECTS AND FEATURES OF THE INVENTION

The present invention aims at reducing the material consumption in connection with the manufacture of hooks for webbing of the above-mentioned type, and thereby lowering the total cost of the production of the same significantly. Thus, a primary object of the invention is to provide a hook for webbing, which, by the geometrical shape thereof, allows the use of minimal quantities of rod material for a given loading capacity, at the same time as the cross piece of the hook does not run the risk of sagging or deforming when the webbing together with the hook are subjected to a maximum load. Thus, for a hook with a predetermined loading capacity, a rod blank having considerably smaller cross-section than a corresponding round rod blank in conventional hooks for webbing should be possible to use, without the proper hook part tending to straighten out at maximum load.

According to the invention, at least the primary object is attained by the features defined in the characterizing clause of claim 1. Preferred embodiments of the invention are furthermore defined in the dependent claims.

BRIEF DESCRIPTION OF THE APPENDED DRAWINGS

In the drawings:

FIG. 1 is a perspective view showing a hook according to the invention viewed obliquely from the front, FIG. 2 is a partially cut side view of the hook according to FIG. 1, FIG. 3 is a cross-section A—A in FIG. 2, FIG. 4 is a schematic section showing a rod cross-section in a co-ordinate system, FIG. 5 is a perspective view showing a second, alternative embodiment of the hook according to the invention, FIG. 6 is a front view of the hook according to FIG. 5, FIG. 7 is a partly cut side view of the hook according to FIGS. 5 and 6, FIG. 8 is a cross-section A—A in FIG. 7, and FIG. 9 is a cross-section corresponding to FIG. 8 showing a further alternative embodiment of the invention.

DETAILED DESCRIPTION OF PREFERRED EMBODIMENTS OF THE INVENTION

Figure 1:
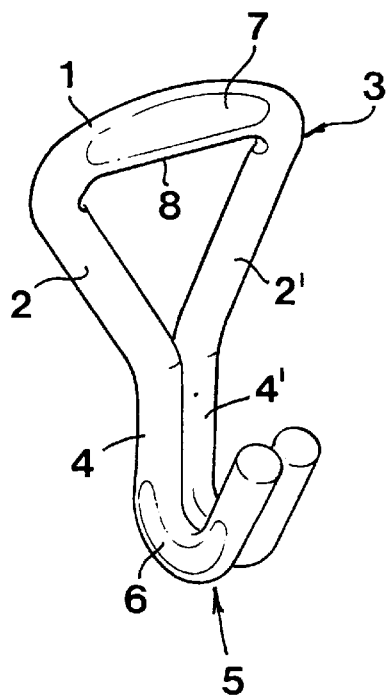

The hook illustrated in FIGS. 1 to 4 is made in one single piece from an elongated blank, viz. in the form of a metal rod, which has been bent to the shape shown. In the present embodiment, the rod blank consists of a genuine round rod, i.e. a rod which initially has a circular cross-sectional shape along the entire length thereof. After bending, the hook includes an upper cross piece 1 for receipt of a webbing (not shown). At opposite ends the cross piece transforms into two legs or side pieces 2, 2' converging therefrom. Together with the cross piece these legs form a substantially triangular loop part, generally designated 3. The lower ends of the legs 2, 2' in turn transform into two curved rod portions 4, 4', which together form a lower hook part, generally designated 5.

The expressions "upper" cross piece and "lower" hook part, respectively, are in this description and the following claims solely used for the purpose of achieving a simple terminology without any connection to the use of the hook in practice. Accordingly, it is obvious that the hook in practical use can take any possible position in space, e.g. with the hook part turned upwards and the cross piece turned downwards.

Figure 3:
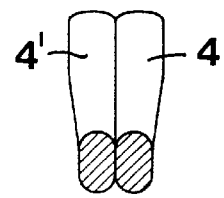
Figure 4:
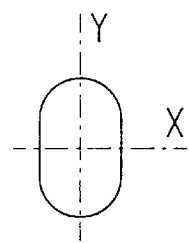

Each one of the two curved rod portions 4, 4' of the hook part 5 has, in a cross-section at least in the area of the bottom of the hook part, a height larger than the width thereof, and thus a moment of inertia which is larger than the moment of inertia of a conventional round rod. In practice, the height of the cross-section of the rod should be at least 1,3 times larger than the width thereof. In the embodiment shown, this increased moment of inertia or bending resistance has been accomplished by mechanical, flattening treatment of the rod material along the surface areas designated 6. In this way, the two curved rod portions attain an elongated circular cross-sectional shape, as shown in FIGS. 3 and 4, respectively. In the example according to FIG. 4, the individual arc rod portion in the cut A—A has a height or major axis Y which is about 1,7 times larger than the width or minor axis X. Of course, this ratio X/Y may be larger as well as smaller than 1,7, but should exceed 1,3. In practice, this implies that the moment of inertia of the rod portion in the cut A—A is considerably increased compared to the moment of inertia of the other, cross-section-wise circular portions of the hook.

The two hook-part forming rod portions 4, 4' may, per se be positioned side by side adjacent to each other, without mutual connection. In practice, though, the rod portions are advantageously permanently interconnected, for instance by means of spot welds or other welds (not shown).

Figure 2:
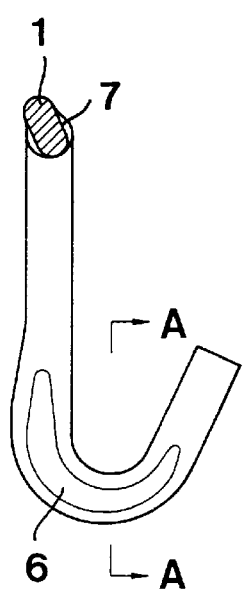

Also the cross piece 1 is stiffened by having been subjected to a flattening mechanical machining or treatment. More specifically, FIGS. 1 and 2 show how plane, opposite surface areas 7 are provided on the cross piece in a way that this, at least along a central portion, attains a cross-section-wise larger height than width and thus a considerably improved flexural rigidity. Advantageously, the flattening of the cross piece is effected in such a way that the lower edge 8 thereof remains straight at the same time as the normal or major axis of the flattening is obliquely inclined in relation to the surrounding legs 2, 2'. More specifically, the major axis of the flattening should be brought to join a plane of forces extending towards the curved rod portions of the hook part. In this way, the cross piece will have a maximum flexural rigidity in the plane in which tension is transferred between, on one hand, a webbing connected to the cross piece and, on the other hand, an object hooked to the hook part.

It should also be pointed out that the hook part 5, provided by the rod portions 4, 4', extends perpendicularly to the plane of the loop part 3, although it is conceivable per se to direct the hook part at other angles in relation to the plane of the loop part.

Reference is now made to FIGS. 5 to 8 which illustrate an embodiment in which the hook is made from a blank in the form of a rod having already initially an elongated, round cross-section shape along the entire length thereof. In the example, the cross-section of the rod is delimited between, on one hand, two plane, opposite surfaces and, on the other hand, two opposite, semi-circularly shaped surfaces. Such a rod blank may also have a truly oval or elliptical cross-sectional shape. Already by using a blank the major axis of which is larger than the minor axis thereof, an increase of the flexural rigidity is accomplished in the cut A—A in comparison with conventional hooks made from a round rod. In this case, an optimum flexural rigidity is accomplished in the cross piece 1 by turning and obliquely inclining the cross piece in relation to the surrounding legs 2, 2'.

In FIG. 9 is also shown how the two curved rod portions 4, 4' of the hook part may be positioned one above the other. The rod portions may also be fixedly interconnected, for instance by spot welds (not shown). In this embodiment, the hook part attains a total moment of inertia being larger than the sum of separate moment of inertia of the two curved rod portions.

FEASIBLE MODIFICATIONS OF THE INVENTION

The invention is not limited solely to the embodiments described above and shown in the drawings. Thus, it is conceivable to provide the hook with a proper hook part consisting of only one single curved rod portion. In such cases, only one of the legs is extended in the area below the loop part, the end of the other leg advantageously being welded at a point positioned in the transition between the first leg and the hook part. Finally, it should be pointed out that a rod-shaped body having a polygonal cross-sectional shape, e.g. square or rectangular, might also be used as a blank for the hook.

What is claimed is:

1. A hook for webbing comprising a metal rod bent in a single piece having an upper cross piece (1) intended for receiving a webbing, said cross piece transforming into two legs (2, 2') which converge from opposite ends thereof so as to form a loop part (3) together with the cross piece and at least one of which transforms into a curved rod portion (4, 4') for forming a lower hook part (5), characterized in that the curved rod portion (4, 4') of the hook part (5) has, in a cross-section at least in the area of a bottom of the hook part, a height (Y) which is larger than a width (X) thereof and thus a moment of inertia which is larger than the moment of inertia of a conventional round rod, and that at least a central portion (7) of the cross piece (1) has a cross-section-wise larger height than width and is, with the geometrical major axis thereof, obliequely inclined in relation to the legs (2, 2'), more precisely into a plane of forces extending towards the hook part.

2. A hook according to claim 1, characterized in that the cross piece (1) has a straight lower edge (8).

3. The hook according to claim 2, characterized in that the hook is made of a starting material in the form of a rod having an elongated round cross-section shape.

4. The hood according to claim 3, in which each one of the legs (2, 2') are transformed into two curved rod portions (4, 4') which together form said hook part (5), and said two curved rod portions (4, 4') being fixedly interconnected, characterized in that one of said curved rod portions (4) is located on the top of the other curved rod portion (4') while forming said hook part (5) having a moment of inertia which is larger than the sum of the individual moment of inertia of the two curved rod portions of the hook part.

5. The hood according to claim 2, in which each one of the legs (2, 2') are transformed into two curved rod portions (4, 4') which together form said hook part (5), and said two curved rod portions (4, 4') being fixedly interconnected, characterized in that one of said curved rod portions (4) is located on the top of the other curved rod portion (4') while forming said hook part (5) having a moment of inertia which is larger than the sum of the individual moment of inertia of the two curved rod portions of the hook part.

6. The hook according to claim 1, characterized in that the hook is made of a starting material in the form of a rod having an elongated round cross-section shape.

7. The hood according to claim 6, in which each one of the legs (2, 2') are transformed into two curved rod portions (4, 4') which together form said hook part (5), and said two curved rod portions (4, 4') being fixedly interconnected, characterized in that one of said curved rod portions (4) is located on the top of the other curved rod portion (4') while forming said hook part (5) having a moment of inertia which is larger than the sum of the individual moment of inertia of the two curved rod portions of the hook part.

8. The hook according to claim 1, in which each one of the legs (2, 2') are transformed into two curved rod portions (4, 4') which together form said hook part (5), and said two curved rod portions (4, 4') being fixedly interconnected, characterized in that one of said curved rod portions (4) is located on the top of the other curved rod portion (4') while forming said hook part (5) having a moment of inertia which is larger than the sum of the individual moment of inertia of the two curved rod portions of the hook part.

* * * * *